United States Patent Office 2,759,013
Patented Aug. 14, 1956

2,759,013
STEROID INTERMEDIATES

Melvin S. Newman, Columbus, Ohio, and Sambasiva Swaminathan, Mylapore, India, assignors to The Ohio State University Research Foundation, Columbus, Ohio, a corporation of Ohio No Drawing. Application June 17, 1953,
Serial No. 362,392

17 Claims. (Cl. 260—464)

The invention disclosed in this application relates to the novel compounds 1-cyano-6-alkoxy-8α-methyl-3,7,8,-8α-tetrahydronaphthalenes and its isomeric derivatives 6-oxo-8α-methyl-3,4,6,7,8,8α-hexahydro-1-naphthoic acid, and 6-oxo-8α-methyl-1,2,6,7,8,8α-hexahydro-1-naphthoic acid, and to methods for their preparation.

The present application is a continuation-in-part of our copending applications, Serial No. 251,244, filed October 13, 1951, and Serial No. 267,432, filed January 21, 1952, both now abandoned.

The novel compounds are useful as intermediates in the total synthesis of steroids. The novel 1-cyano-6-alkoxy-8α-methyl-3,7,8,8α-tetrahydronaphthalene is converted by hydrolysis to the novel 6-oxo-8α-methyl-3,4,6,-7,8,8α-hexahydro-1-naphthoic acid and the latter can be converted to 1-acetyl-6-oxo-8α-methyl-3,4,6,7,8,8α-hexahydronaphthalene by reacting with thionyl chloride and mixing the resulting reaction product with dimethyl cadmium, and the resulting 1-acetyl-6-oxo-8α-methyl-3,4,6,7,8,8α-hexahydronaphthalene can be converted to cortisone according to the procedure disclosed by Friedmann et al. (Chem. and Ind., September 15, 1951, pages 777–778). The novel 1-cyano-6-alkoxy-8α-methyl-3,7,-8,8α-tetrahydronaphthalene can be converted directly to the 1-acetyl-6-oxo-8α-methyl-3,4,6,7,8,8α-hexahydronaphthalene by reacting with methyl magnesiumbromide and hydrolyzing the resulting addition product with an acid in the presence of water. The compounds of the present invention are also useful as plant growth regulators.

In the novel processes of the present invention we employ a compound identified as a 1-hydroxy-1-cyano-6-alkoxy - 8α - methyl - 1,2,3,7,8,8α-hexahydronaphthalene (where the alkoxy group may be either methoxy, ethoxy, propoxy, butoxy, amoxy, hexoxy, heptoxy, or octoxy) as an intermediate in the synthesis of our new compositions of matter. We prefer to obtain the above identified hexahydronaphthalene compound by reacting a 1,2,3,7,-8,8α-hexahydro-6-alkoxy-8α-methyl - 1 - oxonaphthalene with potassium cyanide and acetic acid, all reactants being dissolved in ethanol. Instead of potassium cyanide any other alkali cyanide may be used and instead of ethanol any other similar alcoholic solvent may be used. As stated, the alkoxy group may be methoxy, ethoxy, propoxy, butoxy, amoxy, hexoxy, heptoxy, or octoxy.

The starting compound (i. e. the 1,2,3,7,8,8α-hexahydro-6-alkoxy-8α-methyl-1-oxonaphthalene) has a formula of

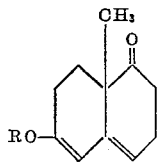

in which RO is alkoxy and is produced by reacting 8α-methyl-1,6-dioxo - 1,2,3,4,6,7,8,8α-octahydronaphthalene (U. S. Patent 2,542,223) with a trialkylorthoformate in the presence of an acid catalyst. The novel 1,2,3,7,8,-8α - hexahydro-6-alkoxy-8α-methyl-1-oxonaphthalene reacts with the alkali cyanide and acetic acid to obtain a 1-hydroxy-1-cyano-6-alkoxy-8α-methyl - 1,2,3,7,8,8α-hexahydronaphthalene having a formula as follows:

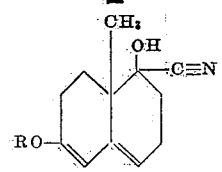

The 1-hydroxy-1-cyano-6-alkoxy-8α-methyl - 1,2,3,7,8,-8α-hexahydronaphthalene thus obtained is dehydrated, preferably by the addition of pyridine and phosphorus oxychloride, and heating to a temperature between about 120 and 175 degrees centigrade, suitably between about 130 to 150 degrees centigrade, for a period between about one-half to three hours to yield 1-cyano-6-alkoxy-8α-methyl-3,7,8,8α-tetrahydronaphthalene. Advantageously the reaction mixture can be permitted to stand at room temperature, say for about twenty hours, prior to heating. The resulting dehydrated reaction product is thereupon hydrolyzed by refluxing with an alkali-metal hydroxide to produce an alkali-metal salt of 6-alkoxy-8α-methyl-3,7,8,8α-tetrahydro-1-naphthoic acid. The free acid is then readily prepared by hydrolysis of the alkali-metal salt with a mineral acid, e. g., hydrochloric, sulfuric, or the like, whereupon 6-oxo-8α-methyl-3,4,6,7,8,-8α-hexahydro-1-naphthoic acid is extracted from the acid mixture with ether.

The following examples, in which the parts are by weight unless otherwise specified, are illustrative of the process and products of the present invention, but are not to be construed as limiting.

PREPARATION 1.—1,2,3,7,8,8α-HEXAHYDRO-6-ETHOXY-8α-METHYL-1-OXONAPHTHALENE

A mixture of 43.2 grams of 8α-methyl-1,6-dioxo-1,2,-3,4,6,7,8,8α-octahydronaphthalene, 36 milliliters of absolute ethanol, 41 grams of triethylorthoformate, 240 milliliters of dry benzene, and eight milliliters of five percent alcoholic hydrochloric acid was refluxed for two hours on a water bath maintained at 75 to 80 degrees centigrade. The mixture was then cooled, neutralized with ten percent alcoholic sodium hydroxide solution, and extracted with 200 milliliters of ether. The ether extract was washed successively with 100 milliliters of water, 300 milliliters of five percent aqueous sodium hydroxide solution, 100 milliliters of water, and a saturated sodium chloride solution, and then dried over anhydrous sodium sulfate. The ether was removed and the residual liquid, weighing 51 to 52 grams, was distilled under vacuum and an orange-yellow liquid distilling at 101 to 104 degrees centigrade at one milliliter pressure and having an index of refraction, $N_D^{24}$ 1.5257, was collected.

A portion of the product obtained above was redistilled, and the fraction which distilled at 102 degrees centigrade at 0.7 milliliter of mercury analyzed as follows:

Analysis.—Calculated for $C_{13}H_{18}O_2$: C, 75.7; H, 8.8. Found: C, 75.2; H, 9.1.

In the same manner as shown in Preparation 1, other 1,2,3,7,8,8α-hexahydro-6-alkoxy - 8α - methyl-1-oxonaphthalenes such as 1,2,3,7,8,8α - hexahydro-6-methoxy-8α-methyl - 1 - oxonaphthalene, 1,2,3,7,8,8α - hexahydro - 6 - propoxy-8α-methyl-1-oxonaphthalene, 1,2,3,7,8,8α - hexahydro-6-butoxy-8α-methyl-1-oxonaphthalene, and the corresponding amoxy, hexoxy, heptoxy, and octoxy compounds can be prepared by utilizing the corresponding lower-(trialkyl)-orthoformate in lieu of the triethylorthoformate utilized in Preparation 1.

PREPARATION 2.—1-HYDROXY-1-CYANO-6-ETHOXY-8α-METHYL-1,2,3,7,8,8α-HEXAHYDRONAPHTHALENE

In a one liter two-necked flask provided with a stirrer was placed potassium cyanide (99 g.) and ethanol (160 ml.). The mixture was stirred and cooled in ice; glacial acetic acid (90 ml.) and a solution of 24.7 g. of 1,2,3,7,8,8α-hexahydro-6-ethoxy-8α-methyl-1-oxonaphthalene in 100 ml. of ethanol were added in succession and dropwise while maintaining good stirring. After three hours at 0°, the reaction mixture was diluted with water (480 ml.) and the yellow solid which separated, was collected and dried (17 g.). The aqueous-alcoholic filtrate on further dilution with water and standing deposited more product (3.2 g.). The crops were combined and crystallized from ether; yield, 13 g.; M. P. 145–155°. After three crystallizations the compound melted at 155–158° centigrade and exhibited the following characteristics:

Ultra-violet spectrum:

$\lambda\text{EtOH}_{max}$, 242 m$\mu$; $\log_{10}$ E=4.3

Analysis.—Calculated for $C_{14}H_{19}NO_2$: C, 72.1; H, 8.2; N, 6.0. Found: C, 71.7; H, 8.8; N, 6.2.

In the same manner as shown in Preparation 2, other 1-hydroxy-1-cyano - 6 - alkoxy - 8α - methyl-1,2,3,7,8,8α-hexahydronaphthalenes such as 1-hydroxy-1-cyano-6-methoxy-8α-methyl-1,2,3,7,8,8α - hexahydronaphthalene, 1 - hydroxy - 1 - cyano-6-propoxy-8α-methyl-1,2,3,7,8,8α-hexahydronaphthalene, 1-hydroxy-1-cyano-6-butoxy-8α-methyl-1,2,3,7,8,8α-hexahydronaphthalene, and the corresponding amoxy, hexoxy, heptoxy, and octoxy are prepared by utilizing the corresponding 1,2,3,7,8,8α-hexahydro-6-alkoxy-8α-methyl-1-oxonaphthalene.

*Example 1.—1-cyano-6-ethoxy-8α-methyl-3,7,8,8α-tetrahydronaphthalene*

To an ice-cold solution of 1-cyano-1-hydroxy-6-ethoxy-8α-methyl-1,2,3,7,8,8α-hexahydronaphthalene (I) (42 g.) in pyridine (175 ml.) was added dropwise phosphorus oxychloride (34 ml.). The resulting mixture was allowed to stand at room temperature for 20 hours and afterwards heated on a steam bath for 2 hours. After cooling, the reaction mixture was decomposed with ice, acidified with concentrated hydrochloric acid and immediately extracted with ether. The ether extract was successively washed with water and saturated sodium chloride solution. After drying over sodium sulfate, it was concentrated. The residual liquid weighed 32 g. and was distilled; B. P. 125–130°/0.2 mm.; yield, 25 g. To ensure that this material was free from a product arising from hydrolysis of the enol ether linkage, it was treated with ethyl orthoformate as follows:

A mixture of the dehydration product (10 g.) obtained above, ethyl orthoformate (9.5 ml.), benzene (100 ml.) and alcoholic hydrochloric acid (12./., 1.5 ml.) was heated on a steam bath for 2½ hours. After cooling, the reaction mixture was neutralized with sodium hydroxide, washed with saturated sodium chloride solution and concentrated. The residual liquid was distilled and the portion distilling at 105–109°/0.2 mm., 8 g., showed the following characteristics:

Ultra-violet spectrum:

$\lambda\text{EtOH}_{max}$, 232 m$\mu$; $\log_{10}$ E=5.08

The position of the maximum and the large value for extinction confirm the structure.

Analysis.—Calculated for $C_{14}H_{17}ON$: N, 6.5. Found: N, 6.3.

The infra-red spectrum indicated the presence of the nitrile group and the absence of the hydroxyl group.

The nitrile was characterized further by the product obtained on hydrolysis with alkali. A mixture of nitrile (6 g.), ethylene glycol (40 ml.), water (10 ml.) and sodium hydroxide (5 g.) was refluxed for 8 hours. After cooling, the reaction mixture was poured into water and unreacted nitrile removed by extraction with ether. The aqueous layer was acidified with dilute sulfuric acid and heated on a steam bath for 10 minutes with decolorizing charcoal. The solution was filtered hot and the filtrate on cooling, deposited crystals. These were collected and recrystallized from ethanol. M. P. 159°.

Analysis.—Calculated for $C_{12}H_{14}O_3$: C, 69.9; H, 6.8. Found: C, 70.0, 70.1; H, 7.2, 7.0.

The ultra violet absorption curve for the substance ($\lambda\text{EtOH}_{max}$, 286 m$\mu$; $\log_{10}$ E=3.52) indicated it to be 6-oxo-8α-methyl-1,2,6,7,8,8α-1-naphthoic acid having the formula:

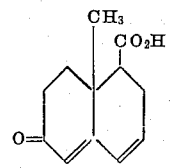

In the same manner as disclosed in Example 1 the following 1-cyano-6-alkoxy - 8α - methyl-3,7,8,8α-tetrahydronaphthalenes are prepared by utilizing the corresponding 1-cyano-1-hydroxy - 6 - alkoxy-8α-methyl-1,2,3,7,8,8α-hexahydronaphthalene: 1-cyano - 6 - methoxy-8α-methyl-3,7,8,8α-tetrahydronaphthalene, 1-cyano - 6 - propoxy-8α-methyl-3,7,8,8α-tetrahydronaphthalene, 1-cyano-6-butoxy-8α - methyl - 3,7,8,8α - tetrahydronaphthalene, 1-cyano-6-amoxy - 8α - methyl - 3,7,8,8α-tetrahydronaphthalene, 1-cyano - 6 - hexoxy - 8α - methyl-3,7,8,8α-tetrahydronaphthalene, 1-cyano-6-heptoxy - 8α - methyl-3,7,8,8α-tetrahydronaphthalene, 1-cyano-6-octoxy-8α-methyl-3,7,8,8α-tetrahydronaphthalene, and the like.

*Example 2. — 6-oxo-8α-methyl-3,4,6,7,8,8α-hexahydro-1-naphthoic acid*

A mixture of 1-hydroxy-1-cyano-6-ethoxy-8α-methyl-1,2,3,7,8,8α-hexahydronaphthalene prepared as described in Preparation 2 (2.4 g.), pyridine (60 ml.) and phosphorus oxychloride (1.5 ml.) was heated in a sealed tube at 130–150° for 1½ hours. The dark brown solution was cooled and poured into a mixture of ice and concentrated hydrochloric acid (100 ml.). The organic material was extracted with ether twice and the combined ether extracts were concentrated after drying over anhydrous sodium sulfate. The residual brown liquid was refluxed with a solution of sodium hydroxide (5 g.) in a mixture of water (15 ml.) and ethanol (25 ml.) for eight hours. At the end of this period, the reaction mixture was freed from alcohol, diluted with water and acidified to Congo red. An oil separated and was extracted with ether. The ether layer was washed once with water and then extracted with an aqueous solution of sodium bicarbonate (40 ml., 5%). The bicarbonate extract was acidified (Congo red) with hydrochloric acid and exhaustively extracted with ether. This ether extract was washed once with saturated salt solution and dried over anhydrous sodium sulfate. After removal of ether, approximately 1.5 g. oil remained. After repeated extraction with boiling cyclohexane and cooling, a solid material was obtained and was recrystallized from aqueous alcohol. Yield of 6-oxo-8α-methyl-3,4,6,7,8,8α-hexahydro-1-naphthoic acid, 0.54 g., M. P. 125–127°. The compound was further purified by recrystallization from aqueous ethanol, and melted at 133.5–134.5 degrees centigrade and exhibited the following characteristic:

Ultra-violet spectrum:

$\lambda\text{EtOH}_{max}$, 240 m$\mu$; $\log_{10}$ E=4.4

Analysis.—Calculated for $C_{12}H_{14}O_3$: C, 69.9; H, 6.8. Found: C, 69.7; H, 7.0.

*Example 3.—6-oxo-8α-methyl-3,4,6,7,8,8α-hexahydro-1-naphthoic acid*

In the same manner as shown in Example 2, 6-oxo-8α-methyl - 3,4,6,7,8,8α - hexahydro - 1 - naphthoic acid is prepared by using 1-hydroxy-1-cyano-6-methoxy-8α-methyl-1,2,3,7,8,8αhexahydronaphthalene as the starting compound.

*Example 4.—6-oxo-8α-methyl-3,4,6,7,8,8α-hexahydro-1-naphthoic acid*

In the same manner as shown in Example 2, 6-oxo-8α-methyl-3,4,6,7,8,8α-hexahydro-1-naphthoic acid is prepared by using 1-hydroxy-1-cyano-6-propoxy-8α-methyl-1,2,3,7,8,8α-hexahydronaphthalene as the starting compound.

Other representative 1-hydroxy-1-cyano-6-alkoxy-8α-methyl-1,2,3,7,8,8α-hexahydronaphthalenes which can be employed to produce 6-oxo-8α-methyl-3,4,6,7,8,8α-hexahydro-1-naphthoic acid include 1-hydroxy-1-cyano-6-butoxy - 8α - methyl - 1,2,3,7,8,8α - hexahydronaphthalene, 1 - hydroxy - 1 - cyano - 6 - amoxy - 8α - methyl - 1,2,3,7,8,8α - hexahydronaphthalene, 1 - hydroxy - 1 - cyano - 6 - hexoxy - 8α - methyl - 1,2,3,7,8,8α - hexahydronaphthalene, 1 - hydroxy - 1 - cyano - 6 - heptoxy - 8α - methyl - 1,2,3,7,8,8α - hexahydronaphthalene, 1 - hydroxy - 1 - cyano - 6 - octoxy - 8α - methyl - 1,2,3,7,8,8α - hexahydronaphthalene, and the like.

It is to be understood that this invention is not to be limited to the exact details of operation or exact compounds shown and described, as obvious modifications and equivalents will be apparent to one skilled in the art, and the invention is therefore to be limited only by the scope of the appended claims.

We claim:

1. The process which comprises hydrolyzing 1-cyano-6 - alkoxy-8α-methyl-3,7,8,8α-tetrahydronaphthalene with an alkali to produce an alkali metal salt of 6-oxo-8α-methyl-3,4,6,7,8,8α-hexahydro-1-naphthoic acid.

2. In a process for the preparation of a 6-oxo-8α-methyl-3,4,6,7,8,8α-hexahydro-1-naphthoic acid, the steps of dehydrating 1 - hydroxy-1-cyano-6-alkoxy-8α-methyl-1,2,3,7,8,8α - hexahydronaphthalene with pyridine and phosphorus oxychloride to produce 1-cyano-6-alkoxy-8α-methyl-3,7,8,8α-tetrahydronaphthalene, hydrolyzing the 1-cyano-6-alkoxy-8α-methyl-3,7,8,8α - tetrahydronaphthalene with an alkali-metal hydroxide to produce an alkali-metal salt of 6-alkoxy-8α-methyl-3,4,6,7,8,8α-hexahydro-1-naphthoic acid, and hydrolyzing the alkali-metal salt to produce the desired acid.

3. In the process for the preparation of 1-cyano-6-alkoxy - 8α - methyl-3,7,8,8α-tetrahydronaphthalene, the step of dehydrating 1 - hydroxy-1-cyano-6-alkoxy-8α-methyl - 1,2,3,7,8,8α - hexahydroxynaphthalene by heating with pyridine and phosphorus oxychloride.

4. In a process for the preparation of 1-cyano-6-ethoxy - 8α - methyl-3,7,8,8α-tetrahydronaphthalene, the step of dehydrating 1 - hydroxy-1-cyano-6-ethoxy-8α-methyl - 1,2,3,7,8,8α - hexahydronaphthalene by heating with pyridine and phosphorus oxychloride.

5. In a process for the preparation of 6-oxo-8α-methyl-3,4,6,7,8,8α-hexahydro-1-naphthoic acid, the steps of dehydrating 1-hydroxy-1-cyano-6-ethoxy - 8α - methyl-1,2,3,7,8,8α-hexahydro naphthalene by heating with pyridine and phosphorous oxychloride, and hydrolyzing the dehydrated product with an alkali-metal hydroxide to produce an alkali-metal salt of 6-ethoxy-8α-methyl-3,4,6,7,8,8α-hexahydro-1-naphthoic acid.

6. In a process for the preparation of 6-oxo-8α-methyl-3,4,6,7,8,8α-hexahydro-1-naphthoic acid, the steps of dehydrating 1-hydroxy-1-cyano-6-ethoxy - 8α - methyl-1,2,3,7,8,8α-hexahydronaphthalene with pyridine and phosphorus oxychloride to produce 1-cyano-6-ethoxy-8α-methyl-3,7,8,8α-tetrahydronaphthalene, hydrolyzing 1-cyano-6-ethoxy-8α-methyl - 3,7,8,8α - tetrahydronaphthalene with an alkali-metal hydroxide to produce an alkali-metal salt of 6-ethoxy-8α-methyl-3,4,6,7,8,8α-hexahydro-1-naphthoic acid, and hydrolyzing the alkali-metal salt to produce the desired acid.

7. In a process for the preparation of 6-oxo-8α-methyl-3,4,6,7,8,8α-hexahydro-1-naphthoic acid, the steps of reacting 1,2,3,7,8,8α - hexahydro-6-alkoxy-8α-methyl-1-oxo-naphthalene with an alkali-metal cyanide and acetic acid to yield 1 - hydroxy-1-cyano-6-alkoxy-8α-methyl-1,2,3,7,8,8α-hexahydronaphthalene, dehydrating with pyridine and phosphorus oxychloride to produce 1-cyano-6-alkoxy-8α-methyl-3,7,8,8α-tetrahydronaphthalene, hydrolyzing the 1-cyano-6-alkoxy-8α-methyl-3,7,8,8α-tetrahydronaphthalene with an alkali-metal hydroxide to produce an alkali-metal salt of the 6-alkoxy-8α-methyl-3,4,6,7,8,8α-hexahydro-1-naphthoic acid, and hydrolyzing the alkali-metal salt to produce the desired acid.

8. In a process for the preparation of 6-oxo-8α-methyl-3,4,6,7,8,8α-hexahydro-1-naphthoic acid, the steps of reacting 1,2,3,7,8,8α-hexahydro-6-ethoxy-8α-methyl-1-oxonaphthalene with an alkali-metal cyanide and acetic acid to yield 1 - hydroxy - 1 - cyano - 6 - ethoxy - 8α - methyl-1,2,3,7,8,8α-hexahydronaphthalene, dehydrating 1-hydroxy - 1 - cyano - 6 - ethoxy - 8α - methyl - 1,2,3,7,8,8α-hexahydronaphthalene with pyridine and phosphorous oxychloride to produce 1-cyano-6-ethoxy-8α-methyl-3,7,8,8α-tetrahydronaphthalene, hydrolyzing 1-cyano-6-ethoxy-8α-methyl-3,7,8,8α-tetrahydronaphthalene with an alkali-metal hydroxide to produce an alkali-metal salt of 6 - ethoxy - 8α - methyl - 3,4,6,7,8,8α - hexahydro - 1-naphthoic acid, and hydrolyzing the alkali-metal salt to produce the desired acid.

9. In a process for the preparation of 6-oxo-8α-methyl-3,4,6,7,8,8α-hexahydro-1-naphthoic acid, the steps of mixing 8α-methyl-1,6-dioxo-1,2,3,4,6,7,8,8α-octahydronaphthalene with a trialkylorthoformate to produce 1,2,3,7,8,8α - hexahydro - 6 - alkoxy - 8α - methyl - 1-oxonaphthalene, reacting 1,2,3,7,8,8α-hexahydro-6-alkoxy-8α-methyl-1-oxonaphthalene with an alkali-metal cyanide and acetic acid to yield 1-hydroxy-1-cyano-6-alkoxy-8α-methyl-1,2,3,7,8,8α-hexahydronaphthalene, dehydrating with pyridine and phosphorus oxychloride to produce 1-cyano - 6 - alkoxy - 8α - methyl - 3,7,8,8α - tetrahydronaphthalene, hydrolyzing the 1-cyano-6-alkoxy-8α-methyl-3,7,8,8α-tetrahydronaphthalene with an alkali-metal hydroxide to produce an alkali-metal salt of 6-alkoxy-8α-methyl-3,4,6,7,8,8α-hexahydro-1-naphthoic acid, and hydrolyzing the alkali-metal salt to produce the desired acid.

10. In a process for the preparation of 6-oxo-8α-methyl-3,4,6,7,8,8α-hexahydro-1-naphthoic acid, the steps of mixing 8α-methyl-1,6-dioxo-1,2,3,4,6,7,8,8α-octahydronaphthalene with triethylorthoformate to produce 1,2,3,7,8,8α-hexahydro-6-ethoxy-8α-methyl-1-oxonaphthalene, reacting 1,2,3,7,8,8α - hexahydro - 6 - ethoxy - 8α - methyl - 1-oxonaphthalene with an alkali-metal cyanide and acetic acid to yield 1-hydroxy-1-cyano-6-ethoxy-8α-methyl-1,2,3,7,8,8α-hexahydronaphthalene, dehydrating with pyridine and phosphorous oxychloride to produce 1-cyano-6-ethoxy - 8α - methyl - 3,7,8,8α - tetrahydronaphthalene, hydrolyzing 1-cyano-6-ethoxy-8α-methyl-3,7,8,8α-tetrahydronaphthalene with an alkali-metal hydroxide to produce an alkali-metal salt of 6-ethoxy-8α-methyl-3,4,6,7,8,8α-hexahydro-1-naphthoic acid, and hydrolyzing the alkali-metal salt to produce the desired acid.

11. A compound selected from the group consisting of 1 - cyano - 6 - alkoxy - 8α - methyl - 3,7,8,8α - tetrahydronaphthalene, 6-oxo-8α-methyl-3,4,6,7,8,8α-hexahydro-1-naphthoic acid, and 6-oxo-8α-methyl-1,2,6,7,8,8α-hexahydro-1-naphthoic acid.

12. 1 - cyano - 6 - alkoxy - 8α - methyl - 3,7,8,8α - tetrahydronaphthalene.

13. 1 - cyano - 6 - ethoxy - 8α - methyl -3,7,8,8α - tetrahydronaphthalene.

14. 1 - cyano - 6 - methoxy - 8α - methyl - 3,7,8,8α-tetrahydronaphthalene.

15. 1 - cyano - 6 - propoxy - 8α - methyl - 3,7,8,8α-tetrahydronaphthalene.

16. 6 - oxo - 8α - methyl - 3,4,6,7,8,8α - hexahydro - 1-naphthoic acid.

17. 6 - oxo - 8α - methyl - 1,2,6,7,8,8α -hexahydro - 1-naphthoic acid.

No references cited.